United States Patent
Chen et al.

(10) Patent No.: US 11,948,006 B2
(45) Date of Patent: Apr. 2, 2024

(54) COMPUTING RESOURCE SHARING SYSTEM AND COMPUTING RESOURCE SHARING METHOD

(71) Applicant: Acer Incorporated, New Taipei (TW)

(72) Inventors: Kuan-Ju Chen, New Taipei (TW); Chia-Jen Tao, New Taipei (TW)

(73) Assignee: Acer Incorporated, New Taipei (TW)

( * ) Notice: Subject to any disclaimer, the term of this patent is extended or adjusted under 35 U.S.C. 154(b) by 274 days.

(21) Appl. No.: 17/402,621

(22) Filed: Aug. 16, 2021

(65) Prior Publication Data

US 2022/0391252 A1 Dec. 8, 2022

(30) Foreign Application Priority Data

Jun. 2, 2021 (TW) ................................. 110120082

(51) Int. Cl.
*G06F 9/50* (2006.01)
*G06F 9/455* (2018.01)
(Continued)

(52) U.S. Cl.
CPC ............ *G06F 9/5005* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557; G06F 9/48;
(Continued)

(56) References Cited

U.S. PATENT DOCUMENTS 8,429,097 B1 4/2013 Sivasubramanian et al.
10,074,206 B1 9/2018 Ingegneri
(Continued)

FOREIGN PATENT DOCUMENTS

CN 105242957 1/2016
TW I592805 7/2017

OTHER PUBLICATIONS

Jiang et al, "A Unified Architecture for Accelerating Distributed DNN Training in Heterogeneous GPU/CPU Clusters", Proceedings of the 14th USENIX Symposium on Operating Systems Design and Implementation, Nov. 4-6, 2020, pp. 463-479 (Year: 2020).*

*Primary Examiner* — Charles M Swift
(74) *Attorney, Agent, or Firm* — JCIPRNET

(57) ABSTRACT

A computing resource sharing system and a computing resource sharing method are provided. The method includes: in response to receiving a resource request signal from a resource request device, obtaining a foreground process, a background process, a name of a software service, and an operating status of the software service of a resource sharing device; determining a specific graphic computing resource to be shared according to the foreground process, the background process, the name of the software service, and the operating status of the software service; applying the specific graphic computing resource to assist the resource request device in performing a graphic computing operation; transmitting a graphic computing result of the graphic computing operation back to the resource request device.

15 Claims, 2 Drawing Sheets

(51) Int. Cl.
*G06F 9/48* (2006.01)
*G06N 20/00* (2019.01)

(52) U.S. Cl.
CPC ............ *G06F 9/45558* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4862* (2013.01); *G06F 9/4875* (2013.01); *G06F 9/4881* (2013.01); *G06F 9/50* (2013.01); *G06F 9/5011* (2013.01); *G06F 9/5027* (2013.01); *G06F 9/5061* (2013.01); *G06F 9/5072* (2013.01); *G06F 9/5083* (2013.01); *G06F 9/5088* (2013.01); *G06F 2009/4557* (2013.01); *G06F 2209/509* (2013.01); *G06N 20/00* (2019.01)

(58) Field of Classification Search
CPC ...... G06F 9/4806; G06F 9/4843; G06F 9/485; G06F 9/4856; G06F 9/4862; G06F 9/4875; G06F 9/4881; G06F 9/50; G06F 9/5005; G06F 9/5011; G06F 9/5027; G06F 9/5061; G06F 9/5072; G06F 9/5083; G06F 9/5088
See application file for complete search history.

(56) References Cited

U.S. PATENT DOCUMENTS

| | | | |
|---|---|---|---|
| 10,721,181 B1* | 7/2020 | Greenwood | H04L 41/0897 |
| 11,128,699 B1* | 9/2021 | Khurrum | G06F 9/45558 |
| 2009/0183168 A1 | 7/2009 | Uchida | |
| 2019/0065078 A1* | 2/2019 | Yerfule | G06F 3/0685 |
| 2019/0176037 A1 | 6/2019 | Leung et al. | |
| 2021/0019179 A1* | 1/2021 | Yadav | G06F 9/5038 |
| 2021/0099450 A1 | 4/2021 | Jain et al. | |
| 2021/0144180 A1* | 5/2021 | Montazeri | H04L 63/102 |
| 2022/0318057 A1* | 10/2022 | Hebbalalu | G06F 9/50 |

* cited by examiner

COMPUTING RESOURCE SHARING SYSTEM AND COMPUTING RESOURCE SHARING METHOD

CROSS-REFERENCE TO RELATED APPLICATION

This application claims the priority benefit of Taiwan patent application serial no. 110120082, filed on Jun. 2, 2021. The entirety of the above-mentioned patent application is hereby incorporated by reference herein and made a part of this specification.

BACKGROUND

Technical Field

The disclosure relates to a resource sharing system and a resource sharing method; more particularly, the disclosure relates to a computing resource sharing system and a computing resource sharing method.

Description of Related Art

In the existing market, most of the computer devices available for e-sports players and creators are highly capable of processing images, and most of these devices are personal desktop computers or heavy notebook computers. These devices have outstanding computing power but poor portability and thus are not suitable for users to carry around to engage in works or activities related to e-sports and creation. Compared with portable electronic devices (such as mobile phones), these devices achieve better visual effects, have better operability and low latency, and can run games with an abundance of gaming content or larger scope; however, the battery capacity of these devices may only allow the users for a one-hour continuous use if these devices are not connected to external power sources, which is apt to cause inconvenience.

If the users intend to engage in works or activities in association with e-sports/creation through the devices with greater portability, these portable devices may experience significant delays or even system failure due to their low graphic processing capabilities.

SUMMARY

The disclosure provides a computing resource sharing system and a computing resource sharing method, which may be applied to solve said technical problems.

An embodiment of the disclosure provides a computing resource sharing system that includes a resource sharing device, and the resource sharing device is configured to: in response to receiving a resource request signal from a resource request device, obtain a foreground process, a background process, a name of at least one software service, and an operating status of each of the at least one software service of the resource sharing device; determine a specific graphic computing resource to be shared according to the foreground process, the background process, the name of the at least one software service, and the operating status of each of the at least one software service; apply a specific graphic computing resource to assist the resource request device in performing a graphic computing operation and transmit a graphic computing result of the graphic computing operation back to the resource request device.

Another embodiment of the disclosure provides a computing resource sharing method adapted for a resource sharing device in a resource sharing system, and the method includes: in response to receiving a resource request signal from a resource request device, obtaining a foreground process, a background process, a name of at least one software service, and an operating status of each of the at least one software service of the resource sharing device; determining a specific graphic computing resource to be shared according to the foreground process, the background process, the name of the at least one software service, and the operating status of each of the at least one software service; applying a specific graphic computing resource to assist the resource request device in performing a graphic computing operation and transmitting a graphic computing result of the graphic computing operation back to the resource request device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
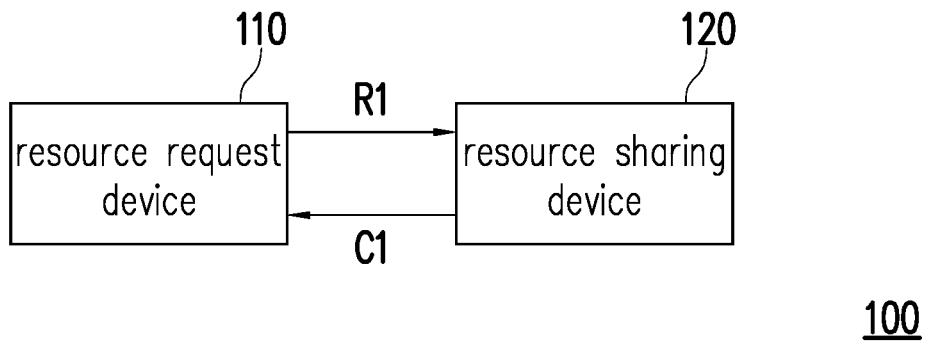
FIG. 1 is a schematic diagram of a resource sharing system according to an embodiment of the disclosure.

Please refer to FIG. 1, which is a schematic diagram of a resource sharing system according to an embodiment of the disclosure. As shown in FIG. 1, the resource sharing system 100 includes a resource request device 110 and a resource sharing device 120. In different embodiments, each of the resource request device 110 and the resource sharing device 120 may be any smart device, any computer device, or any electronic device with computing capabilities (such as a wireless network router), which should not be construed as a limitation in the disclosure.

Generally, the resource request device 110 provided in one or more embodiments of the disclosure may request the resource sharing device 120 to apply a part of computing resources (e.g., a graphic computing resource) to assist the resource request device 110 in performing a computing operation when the computing resources are needed. Correspondingly, the resource sharing device 120 may decide to assist the resource request device 110 in performing the computing operation or reject the request from the resource request device 110 after evaluating its own operating status. If the resource sharing device 120 decides to assist the resource request device 110 in performing the computing operation, the resource sharing device 120 may transmit a computing result back to the resource request device 110 after performing the relevant computing operation for the resource request device 110. As such, the computing burden of the resource request device 110 itself may be alleviated, thereby improving the experience of a user (e.g., an e-sports player/a creator) of the resource request device 110. Further explanation is provided below with reference to FIG. 2.

Figure 2:
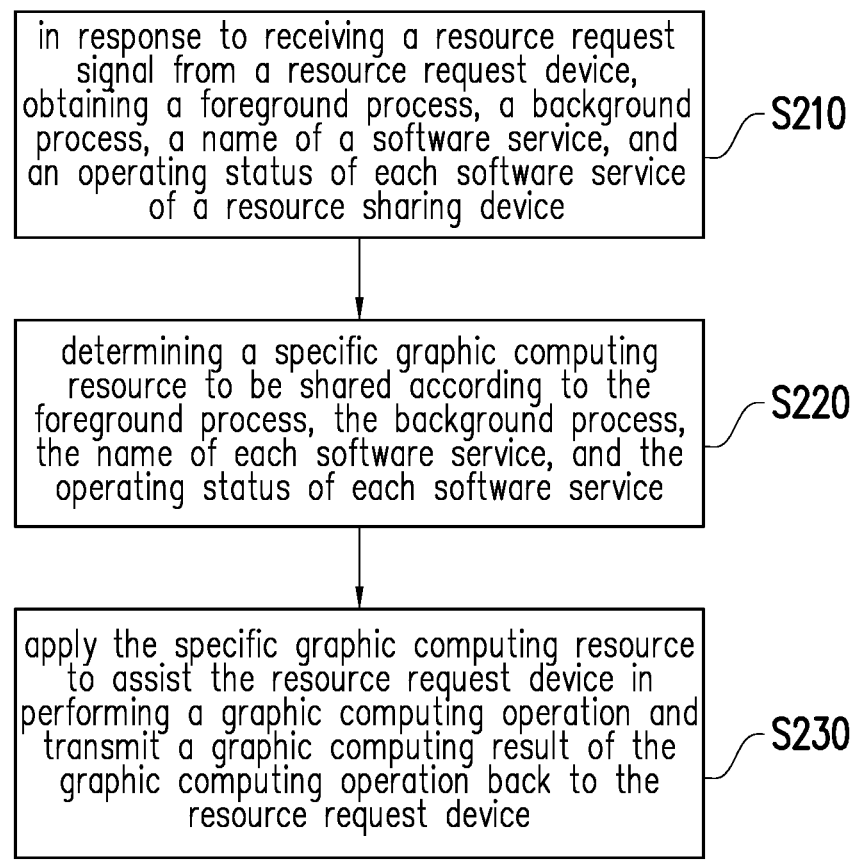
FIG. 2 is a flowchart illustrating a computing resource sharing method according to an embodiment of the disclosure.

Please refer to FIG. 2, which is a flowchart illustrating a computing resource sharing method according to an embodiment of the disclosure. The method provided in this embodiment may be executed by the resource sharing device 120 depicted in FIG. 1, and the details of each step in FIG. 2 are provided with reference to the components shown in FIG. 1.

First, in step S210, in response to receiving a resource request signal R1 from the resource request device 110, the resource sharing device 120 may obtain a foreground process, a background process, a name of a software service, and an operating status of each software service of the resource sharing device 120.

In some embodiments of the disclosure, the foreground process is, for instance, one or more processes running in the foreground of the resource sharing device 120. The background process is, for instance, one or more processes running in the background of the resource sharing device 120. The software service is, for instance, a software service currently running on the resource sharing device 120, and the operating status of each software service is, for instance, an on state/off state, which should however not be construed as a limitation in the disclosure.

After that, in step S220, the resource sharing device 120 may determine a specific graphic computing resource to be shared according to the foreground process, the background process, the name of the software service, and the operating status of each software service.

In the embodiment of the disclosure, the resource sharing device 120 is, for instance, a device with a graphics processing unit (GPU), and the GPU may have its own GPU memory (e.g., a video random access memory, VRAM). In some embodiments, the specific graphic computing resource to be shared is, for instance, a part of memory capacity of the GPU memory, and the resource sharing device 120 may determine how much the capacity of GPU memory should be shared with the resource request device 110 according to a specific mechanism.

In some embodiments, the resource sharing device 120 inputs the foreground process, the background process, the name of the software service, and the operating status of each software service into a pre-trained artificial intelligence (AI) model. Correspondingly, the AI model may determine the specific graphic computing resource to be shared according to the foreground process, the background process, the name of the software service, and the operating status of each software service. That is, the AI model may determine how much the capacity of the GPU memory should be shared with the resource request device 110, which should however not be construed as a limitation in the disclosure.

In some embodiments of the disclosure, to enable the AI model to have the above-mentioned capabilities, during the training process of the AI model, designers may input specially designed training data into the AI model, so that the AI model may corresponding learn from the training. For instance, two groups of trainings may be included in one training data. Here, the first group of training may include a combination of a foreground process, a background process, a name of a software service, and an operating status of the software service, and this combination may be converted into texts and then stored as a corresponding file. The second group of training in the training data may include a certain model of GPU and the capacity of the GPU memory available for sharing. In some embodiments of the disclosure, the shareable capacity of the GPU memory may be calculated, for instance, by subtracting the capacity of the GPU memory correspondingly occupied by the first group of training from the total capacity of the GPU memory, and then subtracting a reserved capacity (e.g., 500 MB), which should however not be construed as a limitation in the disclosure.

Thereby, after inputting various training data to the AI model, the AI model may learn the correlation between the first group of training and the second group of training in various training data. As such, when the AI model is applied for reasoning in the future, the AI model may correspondingly determine/deduce how much the capacity of the GPU memory should be shared as a specific graphic computing resource after receiving a certain group of foreground process, background process, name of the software service, and operating status of the software service, which should however not be construed as a limitation in the disclosure.

After determining the specific graphic computing resource to be shared, in step S230, the resource sharing device 120 may apply the specific graphic computing resource to assist the resource request device 110 in performing a graphic computing operation and transmit a graphic computing result C1 of the graphic computing operation back to the resource request device 110. For instance, when a graphic application program (e.g., a game program/an image creation program, and so on) is running on the resource request device 110, the resource sharing device 120 may apply the specific graphic computing resource to assist the resource request device 110 in performing the graphic computing operation corresponding to the graphic application program (e.g., image content rendering, etc.) and transmit the relevant graphic computing result C1 back to the resource request device 110.

As such, without affecting the operation of the resource sharing device, the resource sharing device may assist the resource request device in performing the computing operation, and the resource request device 110 may directly display the graphic computing result C1 to the user, so as to prevent the user's operating experience from being ruined by the poor computing power of the resource request device 110.

For instance, when an e-sports player carries his/her gaming notebook computer, the player may apply his/her mobile phone as the resource sharing device 120 to assist the gaming notebook computer in performing the graphic computing operation, thereby increasing the battery life of the gaming notebook computer. In some embodiments of the disclosure, the users may also use some wireless network routers with the GPU as the resource sharing device 120. In this case, as long as the user's electronic device is connected to the wireless network router, the wireless network router may act as the resource sharing device 120 to assist the user's electronic device in performing the graphic computing operation, thereby improving the user operating experience.

In addition, the resource request device 110 and the resource sharing device 120 may be connected through cables or in a wireless manner. In this case, as long as the connection between the resource request device 110 and the resource sharing device 120 is valid, no matter where the resource request device 110 is located, the resource sharing device 120 may assist the resource request device 110 in performing the graphic computing operation. For instance, the resource sharing device 120 may be a device which has high graphic computing capabilities and is maintained by a certain manufacturer; as long as the resource request device 110 has a wireless network and/or mobile network communication capabilities, the resource request device 110 may be connected to the resource sharing device 120 through network connection, so that the resource sharing device 120 may assist the resource request device 110 in performing the graphic computing operation.

In some embodiments of the disclosure, upon receiving the resource request signal R1, the resource sharing device 120 may also conduct self-evaluation to determine whether it is capable of sharing computing resources with the resource request device 110. For instance, in response to receiving the resource request signal R1 from the resource request device 110, the resource sharing device 120 may obtain a usage rate of the GPU memory and determine whether a capacity of the GPU memory is greater than a designated capacity (e.g., 1 GB). In an embodiment of the disclosure, in response to determining that the usage rate of the GPU memory is greater than a threshold usage rate (e.g., 90%), or the capacity of the GPU memory is not greater than the designated capacity, the resource sharing device 120 may refuse to assist the resource request device 110 in performing the graphic computing operation. In short, when the computing capabilities of the resource sharing device 120 itself are insufficient and/or the computing load is already high, the resource sharing device 120 may refuse to assist the resource request device 110 in performing the graphic computing operation. In an embodiment of the disclosure, the resource sharing device 120 may transmit a message back to the resource request device 110 to inform the resource request device 110 of looking for other devices with better computing power and/or lower load for assistance, which should however not be construed as a limitation in the disclosure.

By contrast, in response to determining that the usage rate of the GPU memory is not greater than the threshold usage rate and the capacity of the GPU memory is not less than the designated capacity, the resource sharing device 120 may continue to perform steps S220 and S230, which should however not be construed as a limitation in the disclosure.

In some embodiments of the disclosure, after step S220 is executed to determine the specific graphic computing resource to be shared, the resource sharing device 120 may also display a determination message associated with the specific graphic computing resource. Here, the determination message may serve to allow the user of the resource sharing device 120 to determine whether to share the specific graphic computing resource with the resource request device 110. For instance, given that the specific graphic computing resource is determined to be a GPU memory capacity of 200 MB, the resource sharing device 120 may, in the determination message, ask the user whether he/she is willing to apply the capacity of 200 MB of the GPU memory of the resource sharing device 120 to assist the resource request device 110 in performing the graphic computing operation, which should however not be construed as a limitation in the disclosure.

In an embodiment of the disclosure, in response to the determination of the user of the resource sharing device 120 to share the specific graphic computing resource with the resource request device 110, the resource sharing device 120 may continue to proceed to step S230 to apply the specific graphic computing resource to assist the resource request device 110 in performing the graphic computing operation.

On the other hand, in response to the determination of the user of the resource sharing device 120 not to share the specific graphic computing resource with the resource request device 110, the resource sharing device 120 may correspondingly display a resource allocating message which allows the user of the resource sharing device 120 to allocate the specific graphic computing resource.

In an embodiment of the disclosure, the resource allocating message may display the current remaining capacity of the GPU memory and allow the user to input the capacity of the GPU memory to be shared with the resource request device 110 from the current remaining capacity, so as to allocate the specific graphic computing resource to be shared. After that, the resource sharing device 120 may apply the allocated specific graphic computing resource to assist the resource request device 110 in performing the graphic computing operation and transmit a graphic computing result of the graphic computing operation back to the resource request device 110.

In an embodiment of the disclosure, when the user allocates the specific graphic computing resource to be shared by applying said method, it means that the accuracy of the reasoning result of the AI model may need to be adjusted. Therefore, the resource sharing device 120 may retrain the AI model by applying new training data based on the allocated specific graphic computing resource, the foreground process, the background process, the name of each software service, and the operating status of each software service.

In an embodiment of the disclosure, the AI model is, for instance, a reinforcement learning model. In this case, when the resource sharing device 120 determines that the user allocates the specific graphic computing resource to be shared by himself/herself, the resource sharing device 120 may generate a punishment signal to drive the AI model to perform the training again. On the other hand, when the resource sharing device 120 determines that the user has not allocated the specific graphic computing resource to be shared by himself/herself, the resource sharing device 120 may generate a reward signal to maintain the AI model, which should however not be construed as a limitation in the disclosure.

In some embodiments of the disclosure, after step S230 is performed, the resource sharing device 120 may monitor the usage rate of the GPU memory and the corresponding usage duration. In an embodiment of the disclosure, in response to determining that the usage rate of the GPU memory exceeds a first threshold usage rate (e.g., 90%) for a first predetermined time period (e.g., 10 seconds), it means that the resource sharing device 120 may encounter the issue of excessive load because of assisting the resource request device 110 to perform the computing operation. At this time, the resource sharing device 120 may reduce the specific graphic computing resource accordingly and apply the reduced specific graphic computing resource to assist the resource request device 110 in performing the graphic computing operation, which should however not be construed as a limitation in the disclosure.

On the other hand, in response to determining that the usage rate of the GPU memory is lower than a second threshold usage rate (e.g., 50%) for a second predetermined time period (e.g., 10 seconds), it means that the resource sharing device 120 is still sufficient and capable of assisting the resource request device 110, wherein the second threshold usage rate is lower than the first threshold usage rate. Therefore, the resource sharing device 120 may increase the specific graphic computing resource and apply the added specific graphic computing resource to assist the resource request device 110 in performing the graphic computing operation, which should however not be construed as a limitation in the disclosure.

Figure 3:
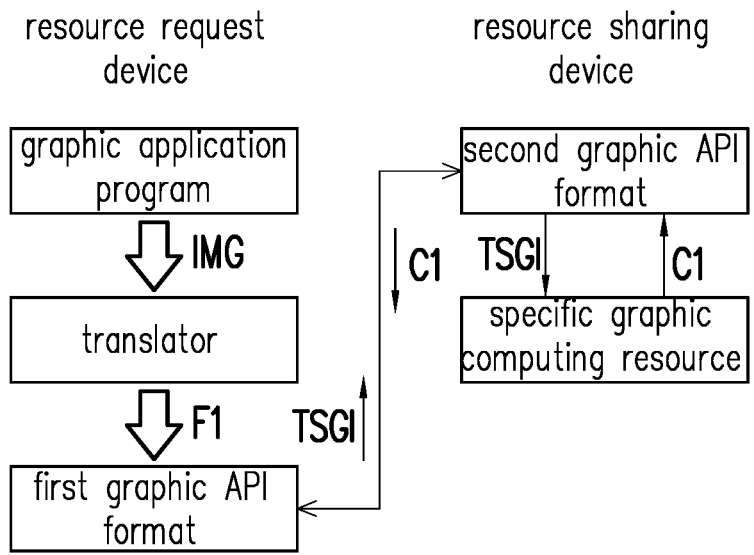
FIG. 3 is a diagram illustrating signal transmission according to a first embodiment of the disclosure.

Please refer to FIG. 3, which is a diagram illustrating signal transmission according to a first embodiment of the disclosure. In this embodiment, it is assumed that the resource request device 110 and the resource sharing device 120 respectively run in a Windows environment and a Linux environment, and the resource request device 110 may run the above-mentioned graphic application program. In this case, graphic data IMG (e.g., in a D3D format) associated with the graphic application program may be converted into a first graphic application programming interface (graphic API) via a translator of the resource request device 110, for instance. In an embodiment of the disclosure, the first graphic API format is, for instance, an OpenGL format, which should however not be construed as a limitation in the disclosure.

Later, in order for the resource sharing device 120 running in the Linux environment to recognize the graphic data IMG, the resource request device 110 may convert the first graphic API format to a tungsten graphic shader infrastructure (TGSI) through the first graphic API and send this TGSI to the resource sharing device 120 through a first socket of the first graphic API. Correspondingly, the resource sharing device 120 may receive the TGSI from the first socket of a second graphic API and perform the graphic computing operation based on the TGSI. After that, the resource sharing device 120 may reversely transmit the graphic computing result C1 back to the resource request device 110 through the above-mentioned mechanism.

Figure 4:
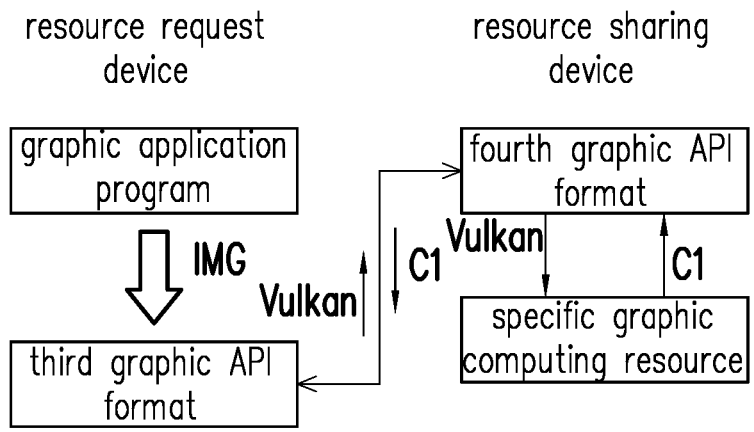
FIG. 4 is a diagram illustrating signal transmission according to a second embodiment of the disclosure.

Please refer to FIG. 4, which is a diagram illustrating signal transmission according to a second embodiment of the disclosure. In this embodiment, it is assumed that the resource request device 110 and the resource sharing device 120 respectively run in a Windows environment and a Linux environment, and the resource request device 110 may run the above-mentioned graphic application program. In this case, the graphic data IMG (e.g., in a D3D format) associated with the graphic application program may be converted into a third graphic API format via the resource request device 110, for instance. In an embodiment of the disclosure, the third graphic API format is, for instance, a Vulkan format, which should however not be construed as a limitation in the disclosure.

After that, the resource request device 110 may send the Vulkan format to the resource sharing device 120 through a third socket of the third graphic API.

Correspondingly, the resource sharing device 120 may receive the Vulkan format from the third socket through a fourth socket of a fourth graphic API and perform the graphic computing operation based on the Vulkan format. After that, the resource sharing device 120 may reversely transmit the graphic computing result C1 back to the resource request device 110 through the above-mentioned mechanism.

Compared with the mechanism shown in FIG. 3, the mechanism shown in FIG. 4 does not need to consume any additional processor resource of the resource request device 110 to perform translation or other operations. Therefore, the mechanism shown in FIG. 4 allows the resource request device 110 to operate with better efficiency. Through experiments, the efficiency of the mechanism shown in FIG. 4 is approximately 1.5 times better than that of the mechanism shown in FIG. 3.

To sum up, through the method provided in one or more embodiments of the disclosure, the devices with poor computing power (such as thinner and lighter notebook computers) or devices with low battery life (such as gaming notebook computers) may act as the resource request device and request the resource sharing device for graphic computing resources. Correspondingly, the resource sharing device may, upon evaluation, apply the GPU memory with the appropriate capacity as the specific graphic computing resource for assisting the resource request device in performing the relevant graphic computing operation and may transmit the corresponding graphic computing results back to the resource request device. Thereby, the resource sharing device may be allowed to assist the resource request device in performing the computing operation without affecting the operation of the resource sharing device.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An electronic system, comprising a first electronic device, wherein the first electronic device is configured to:
    in response to receiving a resource request signal from a second electronic device, obtain a foreground process, a background process, a name of at least one software service, and an operating status of each of the at least one software service of the first electronic device;
    determine a specific graphic computing resource to be shared according to the foreground process, the background process, the name of the at least one software service, and the operating status of each of the at least one software service via inputting the foreground process, the background process, the name of the at least one software service, and the operating status of each of the at least one software service into a pre-trained artificial intelligence model, wherein the artificial intelligence model determines the specific graphic computing resource to be shared according to the foreground process, the background process, the name of the at least one software service, and the operating status of each of the at least one software service;
    display a determination message in association with the specific graphic computing resource, wherein the determination message allows a user of the resource sharing device to determine whether to share the specific graphic computing resource with the second electronic device;
    in response to the user of the first electronic device determining not to share the specific graphic computing resource with the second electronic device, display a resource allocating message, wherein the resource allocating message allows the user of the resource sharing device to allocate the specific graphic computing resource;
    apply the allocated specific graphic computing resource to assist the second electronic device in performing a graphic computing operation, and transmit a graphic computing result of the graphic computing operation back to the second electronic device; and
    retrain the artificial intelligence model based on the allocated specific graphic computing resource, the foreground process, the background process, the name of the at least one software service, and the operating status of each of the at least one software service.

2. The electronic system according to claim 1, wherein after determining the specific graphic computing resource, the resource sharing device is further configured to:

in response to the user of the resource sharing device determining to share the specific graphic computing resource with the second electronic device, apply the specific graphic computing resource to assist the second electronic device in performing the graphic computing operation.

3. The electronic system according to claim 1, wherein the resource sharing device has a graphic processing unit memory, and the specific graphic computing resource comprises a part of a memory capacity of the graphic processing unit memory.

4. The electronic system according to claim 3, before obtaining the foreground process, the background process, the name of the at least one software service, and the operating status of each of the at least one software service of the resource sharing device, the resource sharing device is further configured to:
   in response to receiving the resource request signal from the second electronic device, obtain a usage rate of the graphic processing unit memory and determine whether a capacity of the graphic processing unit memory is greater than a designated capacity;
   in response to determining that the usage rate is greater than a threshold usage rate, or that the capacity of the graphic processing unit memory is not greater than the designated capacity, refuse to assist the second electronic device in performing the graphic computing operation.

5. The electronic system according to claim 4, wherein after applying the specific graphic computing resource to assist the second electronic device in performing the graphic computing operation, the resource sharing device is further configured to:
   in response to determining that the usage rate of the graphic processing unit memory exceeds a first threshold usage rate for a first predetermined time period, reduce the specific graphic computing resource and apply the reduced specific graphic computing resource to assist the second electronic device in performing the graphic computing operation.

6. The electronic system according to claim 4, wherein after applying the specific graphic computing resource to assist the second electronic device in performing the graphic computing operation, the resource sharing device is further configured to:
   in response to determining that the usage rate of the graphic processing unit memory is lower than a second threshold usage rate for a second predetermined time period, increase the specific graphic computing resource and apply the increased specific graphic computing resource to assist the second electronic device in performing the graphic computing operation.

7. The electronic system according to claim 1, further comprising the second electronic device running a graphic application program corresponding to the graphic computing operation, the second electronic device being configured to:
   translate graphic data of the graphic application program into a first graphic application programming interface format through a translator;
   convert the first graphic application programming interface format to a tungsten graphic shader infrastructure through a first graphic application programming interface, and transmit the tungsten graphic shader infrastructure to the resource sharing device through a first socket of the first graphic application programming interface.

8. The electronic system according to claim 7, wherein the resource sharing device is configured to:
   receive the tungsten graphic shader infrastructure from the first socket through a second socket of a second graphic application programming interface; and
   perform the graphic computing operation according to the tungsten graphic shader infrastructure.

9. The electronic system according to claim 1, further comprising the second electronic device running a graphic application program corresponding to the graphic computing operation, the second electronic device being configured to:
   convert graphic data of the graphic application program to a Vulkan format; and
   transmit the Vulkan format to the resource sharing device through a third socket of a third graphic application programming interface.

10. The electronic system according to claim 9, wherein the resource sharing device is configured to:
    receive the Vulkan format from the third socket through a fourth socket of a fourth graphic application programming interface; and
    perform the graphic computing operation based on the Vulkan format.

11. A computing resource sharing method adapted for a first electronic device in a resource sharing system, the method comprising:
    in response to receiving a resource request signal from a second electronic device, obtaining, by the first electronic device, a foreground process, a background process, a name of at least one software service, and an operating status of each of the at least one software service of the first electronic device;
    determining, by the first electronic device, a specific graphic computing resource to be shared according to the foreground process, the background process, the name of the at least one software service, and the operating status of each of the at least one software service via inputting the foreground process, the background process, the name of the at least one software service, and the operating status of each of the at least one software service into a pre-trained artificial intelligence model, wherein the artificial intelligence model determines the specific graphic computing resource to be shared according to the foreground process, the background process, the name of the at least one software service, and the operating status of each of the at least one software service;
    displaying, by the first electronic device, a determination message in association with the specific graphic computing resource, wherein the determination message allows a user of the resource sharing device to determine whether to share the specific graphic computing resource with the second electronic device;
    in response to the user of the first electronic device determining not to share the specific graphic computing resource with the second electronic device, displaying, by the first electronic device, a resource allocating message, wherein the resource allocating message allows the user of the resource sharing device to allocate the specific graphic computing resource;
    applying, by the first electronic device, the allocated specific graphic computing resource to assist the second electronic device in performing a graphic computing operation and transmitting a graphic computing result of the graphic computing operation back to the second electronic device; and retraining, by the first electronic device, the artificial intelligence model based on the allocated specific graphic computing resource, the foreground process, the background process, the name of the at least one software service, and the operating status of each of the at least one software service.

12. The computing resource sharing method according to claim 11, wherein the first electronic device has a graphic processing unit memory, and the specific graphic computing resource comprises a part of a memory capacity of the graphic processing unit memory;

wherein before obtaining the foreground process, the background process, the name of the at least one software service, and the operating status of each of the at least one software service of the first electronic device, the method further comprises:

in response to receiving the resource request signal from the second electronic device, obtaining, by the first electronic device, a usage rate of the graphic processing unit memory and determining, by the first electronic device, whether a capacity of the graphic processing unit memory is greater than a designated capacity;

in response to determining that the usage rate is greater than a threshold usage rate, or that the capacity of the graphic processing unit memory is not greater than the designated capacity, refusing, by the first electronic device, to assist the second electronic device in performing the graphic computing operation.

13. The computing resource sharing method according to claim 12, wherein after applying the specific graphic computing resource to assist the second electronic device in performing the graphic computing operation, the method further comprises:

in response to determining that the usage rate of the graphic processing unit memory exceeds a first threshold usage rate for a first predetermined time period, reducing, by the first electronic device, the specific graphic computing resource and applying, by the first electronic device, the reduced specific graphic computing resource to assist the second electronic device in performing the graphic computing operation;

in response to determining that the usage rate of the graphic processing unit memory is lower than a second threshold usage rate for a second predetermined time period, increasing, by the first electronic device, the specific graphic computing resource and applying, by the first electronic device, the increased specific graphic computing resource to assist the second electronic device in performing the graphic computing operation.

14. The computing resource sharing method according to claim 11, wherein the resource sharing system further comprises the second electronic device running a graphic application program corresponding to the graphic computing operation, and the method further comprises:

translating, by the second electronic device, graphic data of the graphic application program into a first graphic application programming interface format through a translator;

converting, by the second electronic device, the first graphic application programming interface format to a tungsten graphic shader infrastructure through a first graphic application programming interface, and transmitting, by the second electronic device, the tungsten graphic shader infrastructure to the first electronic device through a first socket of the first graphic application programming interface;

receiving, by the first electronic device, the tungsten graphic shader infrastructure from the first socket through a second socket of a second graphic application programming interface; and performing, by the first electronic device, the graphic computing operation according to the tungsten graphic shader infrastructure.

15. The computing resource sharing method according to claim 11, wherein the electronic system further comprises the second electronic device running a graphic application program corresponding to the graphic computing operation, and the method further comprises:

converting, by the second electronic device, graphic data of the graphic application program to a Vulkan format; and transmitting, by the second electronic device, the Vulkan format to the first electronic device through a third socket of a third graphic application programming interface;

receiving, by the first electronic device, the Vulkan format from the third socket through a fourth socket of a fourth graphic application programming interface; and performing, by the first electronic device, the graphic computing operation based on the Vulkan format.

* * * * *